United States Patent

[11] 3,550,667

| [72] | Inventors | Donald R. Bartley<br>Cuyahoga Falls;<br>James Sidles, West Richfield, Ohio |
|---|---|---|
| [21] | Appl. No. | 693,993 |
| [22] | Filed | Dec. 27, 1967 |
| [45] | Patented | Dec. 29, 1970 |
| [73] | Assignee | The B. F. Goodrich Company<br>New York, N.Y.<br>a corporation of New York |

[54] PNEUMATIC TIRE
4 Claims, 2 Drawing Figs.

[52] U.S. Cl. .................................................. 152/361
[51] Int. Cl. .................................................. B60c 9/10
[50] Field of Search .......................................... 152/354,
355, 356, 357, 358, 359, 361

[56] References Cited
UNITED STATES PATENTS
| 2,982,327 | 5/1961 | Vanzo et al. | 152/361 |
| 3,024,828 | 3/1962 | Smith et al. | 152/361 |

FOREIGN PATENTS
| 1,153,397 | 3/1958 | France | 152/361 |

Primary Examiner—James B. Marbert
Attorneys—W. A. Shira, Jr. and H. S. Meyer

ABSTRACT: A pneumatic tire of the type having radially disposed reinforcing cords in the carcass and a restrictive belt or girdle superposed thereon, characterized by the belt or girdle being formed as a circumferentially continuously wound strip of parallel cords disposed in a plurality of sinusoidal windings alternately tangent to opposite axial edges of the belt.

PNEUMATIC TIRE

BACKGROUND OF THE INVENTION

In the manufacture of radial cord tires, the present commonly employed practice is to assemble the carcass, including the beads, the carcass ply or plies of radially disposed cord, and the elastomer covers for the sidewalls, in flat band form on a collapsible building drum. The drum is then collapsed internally, the carcass is removed from the drum and expanded to a generally toroidal form for application of the restrictive belt or girdle and the tread stock. The completely assembled tire is then vulcanized in a mold.

The assembly of the restrictive belt onto the carcass has been the focal point of numerous difficulties in manufacturing radial tires. Thus, it is extremely difficult to expand the carcass to toroidal shape without serious cord distortion when superimposed bias angle plies of inextensible cords are placed over the radial plies in flat band form. This is because the bias angle plies, being of low angle or nearly perpendicular to the radial ply or plies, there is great resistance to the necessary pantographing action of the bias angle plies as the carcass is shaped. Therefore, it has been common practice in manufacturing radial cord tires to expand the carcass of radial plies to inflated configuration before applying the reinforcing plies constituting the restrictive belt. This procedure requires more time and equipment than needed for complete flat band building of the tire. Moreover, the axial curvature of the inflated carcass and the need for precise centering of the reinforcing belt on the carcass, have added to the difficulties and expense of manufacturing radial tires.

In addition to the above-mentioned difficulties of building radial type tires, the customary belt or girdle thereon is formed of layers each having a plurality of separate, parallel cords the many ends of which must be covered or folded inwardly of the edges of the belt to prevent separations from occurring in the shoulder regions of the tire. This further slows production and adds to the cost of the radial tires.

SUMMARY OF THE INVENTION

The present invention solves the above-described problem by the provision of an improved belt means for restricting and reinforcing the crown region of the carcass of a radial cord tire such that the belt may be more easily constructed and simultaneously assembled onto an expanded carcass thereby reducing the cost of manufacture. Moreover, tires incorporating the improved belt means exhibit improved uniformity, i.e., less variation due to deflection under load applied to different circumferential portions.

The improved belt is formed in the presently preferred method, by continuously winding a tape of parallel cords covered by uncured elastomer, circumferentially over the crown of an expanded radial ply carcass in a sinusoidal pattern, with the tape alternately tangent to opposite axial edges of the belt. During the winding, the points of tangency of the tape with the edge of the belt are circumferentially indexed, in consecutive layers of windings, and the winding is continued until the crown of the tire is covered by overlapping portions of the tape and the circumferential edges of the belt are defined by a plurality of closely spaced, tangentially disposed tape overlays. These successive layers of tangentially disposed windings at the edge of the belt provide additional reinforcement to the tread "shoulder" area of the tire. While the improved belt is preferably wound directly upon the toroidally shaped carcass, the nature of the belt provides an improvement in the ease and precision with which the belt may be constructed if the belt is to be wound separately for subsequent assembly on a radial cord carcass.

DETAILED DESCRIPTION

Figure 1:
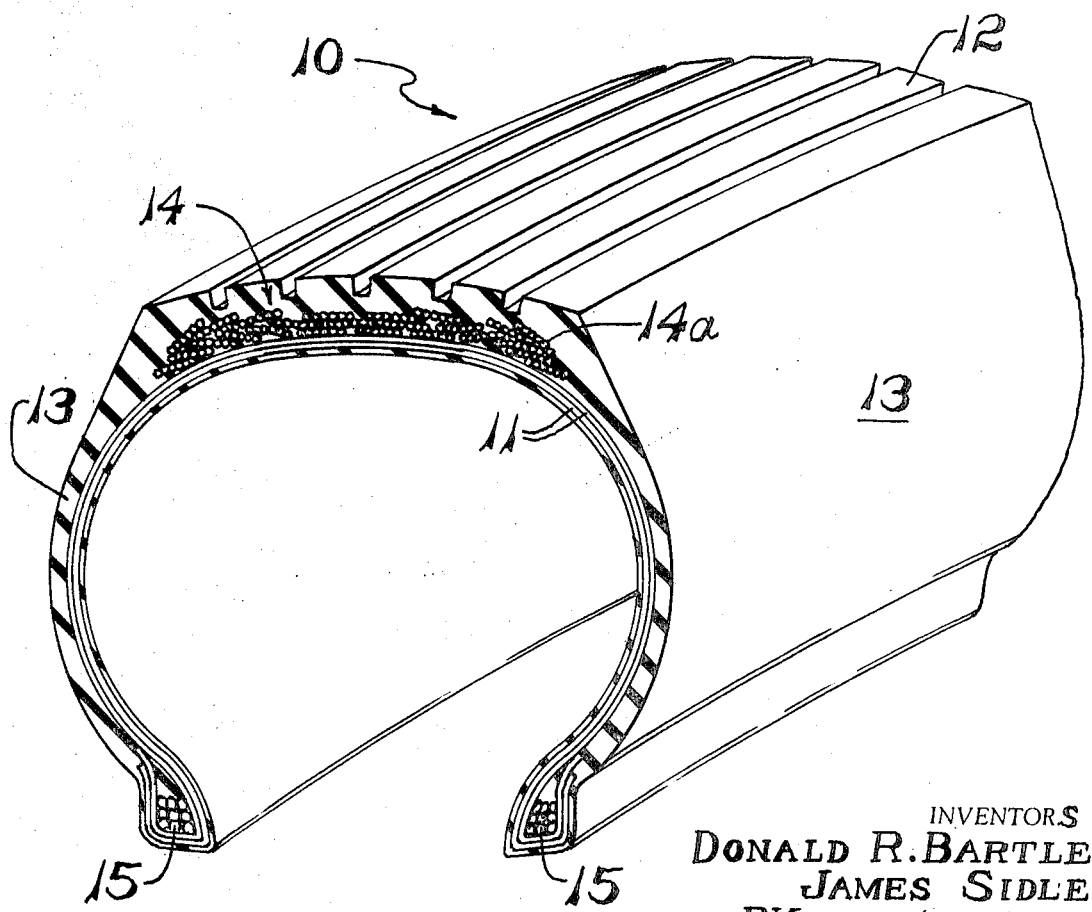
FIG. 1 is a perspective view of a portion of a vulcanized pneumatic tire incorporating this invention.

Referring first to FIG. 1, the improved tire 10 of this invention is shown as comprising a carcass of at least one, and preferably two, layers of radial cord reinforcing plies 11, each ply extending continuously to the spaced bead cores 15 about which the edges of the plies 11 are turned in the conventional manner. The carcass is covered by elastomeric material constituting the usual tread 12 and sidewall covers 13. A tread-reinforcing and carcass-restricting belt or girdle 14 is positioned circumferentially over the crown of the carcass between the latter and the tread.

Figure 2:
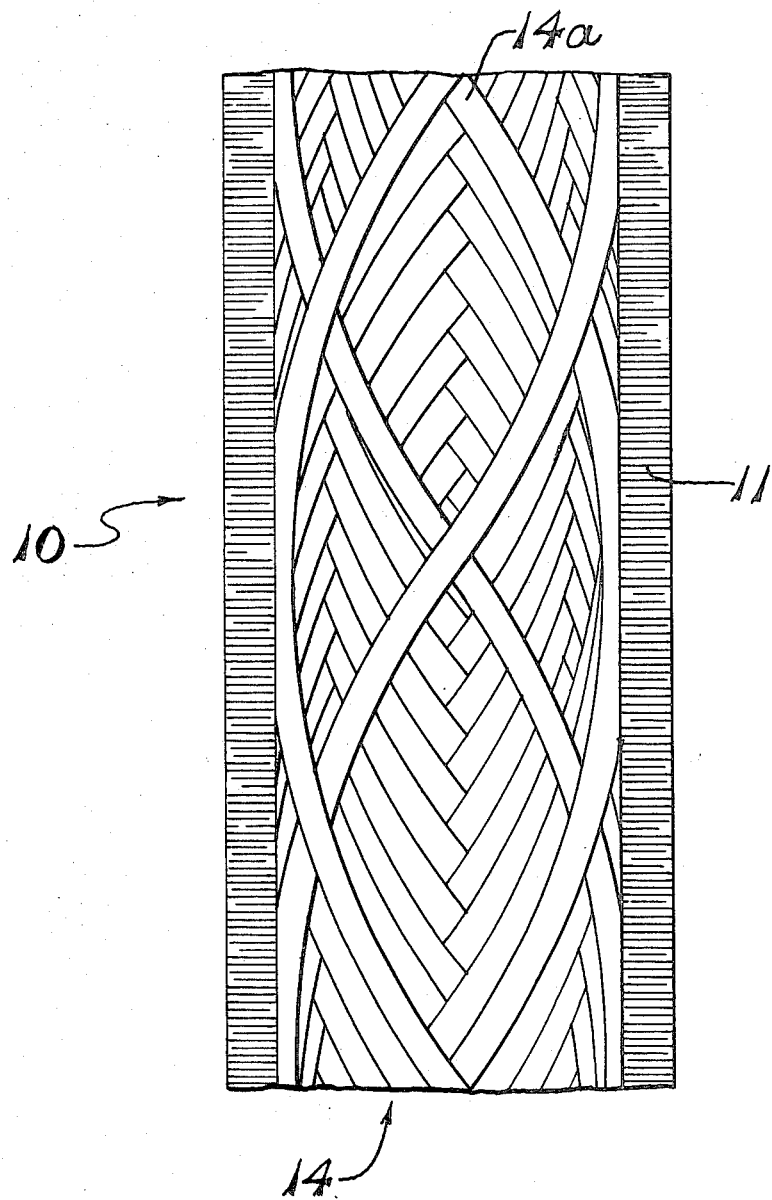
FIG. 2 is a fragmentary plan view of the central portion of the tire carcass shown in FIG. 1 with the tread tread removed, showing in detail the tape-wound reinforcing belt.

The belt or girdle 14 is, in accordance with this invention, formed by continuously winding a tapelike strip 14a, of parallel cords covered with uncured elastomer in a plurality of overlaying generally sinusoidal, windings to form a continuous layer of reinforcing cord extending at low angles to the circumferential center line of the tire. As shown in FIG. 2, the preferred form of the invention has the tape 14a so wound that the regions of change of direction thereof are alternately tangent to lines forming the opposite axial edges of the belt 14. The points of tangency to the edges in adjacent superposed layers of windings are indexed circumferentially so that the edges of the belt are formed solely by cords substantially tangentially disposed to the circumference of the belt edge, b thereby resisting, in direct tension, loads imposed by expansion of the tire under inflation pressure. Furthermore, the successive superposed windings forming the edges of the belt 14 provide a buildup or greater thickness of cords for the "shoulder" or edge portion of the tread thus affording additional reinforcement in this region. This tends to stiffen the tread to resist distortion from forces axially imposed on the tire by the loads transmitted from the moving vehicle.

The tape wound belt may be first wound on a cylindrical form and then transferred to the carcass. Preferably, however, the carcass including the radial ply or plies 11, bead cores 15 and sidewall covers 13 are assembled in flat band form in the conventional manner. This carcass is then shaped to a toroidal configuration and is rotated about its axis while oscillating about an axis at right angles thereto, while a tape of elastomer-covered cords is applied to the crown region of the carcass. The ration ratio of rotation and oscillation is such that the tape is disposed in a sinusoidal arrangement with successive revolutions of the carcass resulting in circumferential indexing of the regions of reversal of direction of the tape. The winding is continued until the crown region of the tire is covered by at least two layers of cords. When the winding is complete, the tire is provided with elastomer for forming the tread, removed from the winding station and vulcanized in a suitable mold.

In the presently preferred form of the invention, as shown in FIGS. 1 and 2, the tape 14a formed of substantially inextensible cords disposed in parallel planar relationship with the cords extending longitudinally of the tape and surrounded by elastomer for winding tires of passenger and truck sizes is preferably approximately seven-eights inches wide. However, the invention is not limited to use of tape of this width and the tape may be made any width convenient and suitable for winding which has been found to be in the range three-eighths to 1 inch. Preferably the tape should have 10 to 20 cords per inch of width. The half-period of the sinusoidal arrangement of the tape preferably subtends a central angle of 30°—90° of the circumference of the tire but not greater than 120° of the circumference of the tire.

An important advantage of the improved belt construction is that there are no cut ends of cords extending to the axial edges thereof, as is the case for conventional bias-angle laid plies in the reinforcing belt where the axial edges thereof are not folded over. Since there are no cut ends extending from the belt 14, good adhesion and reduction of separation between the belt 14, the adjacent elastomer, and the radial cord carcass are provided. This is in contrast to the case of tires having unfolded bias-angle plies in the belt in which tires separations are sometimes experienced at the axial edge region of the belt.

Persons having ordinary skill in the art will be above able to make modifications and adaptations of the disclosed embodiment within the purview of the invention which is more particularly defined in the appended claims.

We claim:

1. A pneumatic vehicle tire of vulcanized elastomeric material comprising a carcass terminating in spaced beans and surmounted by a tread, wherein:
   a. the said carcass includes at least one layer of radially extending reinforcing cords with each cord extending continuously and interconnecting the spaced beads; and
   b. a reinforcing belt is disposed over the crown region of said carcass between the latter and said tread with said belt formed of a tape of parallel cords covered with elastomeric material said tape being a narrow strip substantially less than the width of said belt and disposed in a plurality of windings in a sinusoidal arrangement intersecting tangentially the opposite axial edges of the belt and extending continuously therebetween with the half-period of each wave not exceeding an arc of the circumference of the belt subtending a central angle of 120°, the said belt being substantially inextensible 2. A tire as defined in claim 1, wherein the said sinusoidal windings are sequentially circumferentially displaced with the crown region of the carcass covered by at least two layers of said windings.

3. A tire as defined in claim 2, wherein the thickness of said belt is greater adjacent the edges than in the center thereof.

4. A tire as defined in claim 1, wherein the tape in said belt is a narrow strip having a plurality of parallel, continuous substantially inextensible cords in planar arrangement extending longitudinally of the strip and united by elastomer with preferably 10—20 cords per inch of width and with the width preferably not exceeding one inch.

PO-1050
(5/69)

UNITED STATES PATENT OFFICE
CERTIFICATE OF CORRECTION

Patent No. 3,550,667            Dated    12/29/70

Inventor(s) Donald R. Bartley and James Sidles

It is certified that error appears in the above-identified patent and that said Letters Patent are hereby corrected as shown below:

Column 1, line 74, delete second occurrence of "tread".

Column 2, line 25, delete "b". Line 43, delete "ration".

Column 3, line 1, delete "above". Line 7, "spaced beans" shou read ---spaced beads---.

Signed and sealed this 11th day of May 1971.

(SEAL)
Attest:

EDWARD M. FLETCHER, JR.
Attesting Officer

WILLIAM E. SCHUYLER, J.
Commissioner of Patent